United States Patent
Wu (10) Patent No.: US 11,532,230 B2
(45) Date of Patent: Dec. 20, 2022

(54) SYSTEM, METHOD AND APPARATUS FOR POSITION-BASED PARKING OF VEHICLE

(71) Applicant: Beijing Tusen Zhitu Technology Co., Ltd., Beijing (CN)

(72) Inventor: Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/272,883

(22) Filed: Feb. 11, 2019

(65) Prior Publication Data
US 2019/0279511 A1    Sep. 12, 2019

(30) Foreign Application Priority Data

Feb. 11, 2018 (CN) .......................... 201810143105.0

(51) Int. Cl.
*G08G 1/14* (2006.01)
*B62D 15/02* (2006.01)
(Continued)

(52) U.S. Cl.
CPC .............. *G08G 1/146* (2013.01); *B60T 7/12* (2013.01); *B60T 7/18* (2013.01); *B60T 7/22* (2013.01);
(Continued)

(58) Field of Classification Search
CPC ....... G08G 1/146; G06Q 50/30; B60W 30/06; G01S 13/931; G01S 2013/9314;
(Continued)

(56) References Cited

U.S. PATENT DOCUMENTS

| 5,214,793 | A | | 5/1993 | Conway et al. |
| 6,147,624 | A | * | 11/2000 | Clapper .................. G08G 1/14 340/928 |

(Continued)

FOREIGN PATENT DOCUMENTS

| CN | 102592323 A | 7/2012 |
| CN | 102963355 A | 3/2013 |

(Continued)

OTHER PUBLICATIONS

U.S. Appl. No. 16/272,827 Non-Final Office Action dated Dec. 17, 2019.

(Continued)

*Primary Examiner* — James J Yang
(74) *Attorney, Agent, or Firm* — Paul Liu; Julie J. Muyco; Perkins Coie, LLP (57) ABSTRACT

The present disclosure provides a system, a method and an apparatus for position-based parking of a vehicle, capable of solving the problem in the related art that an unmanned vehicle cannot be parked at a specified position accurately in an environment with a weak GPS signal. The method includes, during position-based parking of a vehicle at a predetermined position: receiving, by a communication device of the vehicle, posture data from a roadside device located within a predetermined range from the predetermined position; deciding, by a vehicle-mounted processing device of the vehicle, whether received posture data satisfies a predetermined positioning rule; determining posture adjustment data for the vehicle when the received posture data does not satisfy the predetermined positioning rule; and controlling the vehicle to perform a posture adjustment operation based on the posture adjustment data.

17 Claims, 4 Drawing Sheets

(51) Int. Cl.
*B60T 7/12* (2006.01)
*G01S 13/931* (2020.01)
*B60W 30/06* (2006.01)
*G06Q 50/30* (2012.01)
*B60T 7/18* (2006.01)
*B60T 7/22* (2006.01)

(52) U.S. Cl.
CPC ......... *B60W 30/06* (2013.01); *B62D 15/0285* (2013.01); *G01S 13/931* (2013.01); *G06Q 50/30* (2013.01); *B60T 2201/022* (2013.01); *B60T 2201/10* (2013.01); *B60Y 2200/14* (2013.01); *G01S 2013/9314* (2013.01)

(58) Field of Classification Search
CPC ... B60T 7/12; B60T 2201/10; B62D 15/0285; B60Y 2200/14
See application file for complete search history.

(56) References Cited

U.S. PATENT DOCUMENTS

| | | | |
|---|---|---|---|
| 9,047,256 | B2 | 6/2015 | Carlson |
| 11,094,201 | B2 | 8/2021 | Wu |
| 2006/0089870 | A1 | 4/2006 | Myhr |
| 2007/0257816 | A1 | 11/2007 | Lyle |
| 2015/0227965 | A1 | 8/2015 | Drysch |
| 2016/0068160 | A1 | 3/2016 | Schofield |
| 2017/0299689 | A1 | 10/2017 | Va et al. |
| 2017/0341640 | A1* | 11/2017 | Liu ............... B62D 15/028 |
| 2018/0120121 | A1 | 5/2018 | Rosario |
| 2018/0345955 | A1* | 12/2018 | Kim ............... B60R 1/00 |
| 2018/0357905 | A1* | 12/2018 | Boss ............... B62D 15/028 |
| 2019/0094330 | A1 | 3/2019 | Adireddy |
| 2019/0220811 | A1* | 7/2019 | Naito ............... B60P 1/02 |
| 2019/0023682 | A1 | 8/2019 | Hall |
| 2019/0251847 | A1 | 8/2019 | Wu et al. |
| 2019/0370573 | A1 | 12/2019 | Duan |
| 2020/0073520 | A1 | 3/2020 | Mohan |

FOREIGN PATENT DOCUMENTS

| | | |
|---|---|---|
| CN | 105718860 A | 6/2016 |
| CN | 105788328 A | 7/2016 |
| CN | 106093954 A | 11/2016 |
| CN | 106340197 A | 1/2017 |
| CN | 106541945 A | 3/2017 |
| CN | 106710281 A | 5/2017 |
| CN | 106940183 A | 7/2017 |
| CN | 106990778 A | 7/2017 |
| CN | 107067794 A | 8/2017 |
| CN | 206574100 U | 10/2017 |
| GB | 2547076 A | 8/2017 |
| KR | 101739235 B1 | 5/2014 |
| WO | 2017046979 A1 | 3/2017 |

OTHER PUBLICATIONS

U.S. Appl. No. 16/272,827 Final Office Action dated May 8, 2020.
Chinese Application No. 201810142491.1 Office Action dated Apr. 15, 2020.
Chinese Application No. 201810142491.1 First Search dated Apr. 7, 2020.
U.S. Appl. No. 16/272,827 Final Office Action dated Jan. 4, 2021, pp. 1-21.
U.S. Appl. No. 16/272,827 Notice of Allowance dated Apr. 21, 2021, pp. 1-25.
Chinese Application No. 201810143105.0, First Office Action dated Sep. 18, 2021, pp. 1-25.
Chinese Application No. 201810143105.0, Second Office Action dated Jan. 30, 2022, pp. 1-24.

* cited by examiner

SYSTEM, METHOD AND APPARATUS FOR POSITION-BASED PARKING OF VEHICLE

CROSS-REFERENCE TO RELATED APPLICATION(S)

This U.S. patent document claims the priority of and the benefits of Chinese Patent Application No. 20180143105.0 of the same title and content that was filed by Applicant Beijing Tusen Weilai Technology Co., Ltd. at the State Intellectual Property Office of China (SIPO) on Feb. 11, 2018, which is incorporated by reference herein in its entirety.

TECHNICAL FIELD

The present disclosure relates to intelligent transportation, and more particularly, to a system, a method and an apparatus for position-based parking of a vehicle.

BACKGROUND

With the development of unmanned driving technology, conventional manned vehicles have been replaced with unmanned vehicles in many application scenarios. In some application scenarios, e.g., in port areas, unmanned vehicles may need to be parked accurately at some specified positions, e.g., under a crane, and there may be very high requirements on the preciseness and accuracy of such position-based parking. However, in these scenarios, there may typically be weak Global Positioning System (GPS) signals or signal interference, such that it would be difficult to achieve accurate position-based parking of unmanned vehicles.

That is, in the related art, there is a problem that an unmanned vehicle cannot be parked at a specified position accurately in an environment with a weak GPS signal.

SUMMARY

In view of the above problem, the present disclosure provides a system, a method and an apparatus for position-based parking of a vehicle, capable of solving the problem in the related art that an unmanned vehicle cannot be parked at a specified position accurately in an environment with a weak GPS signal.

In an aspect of the embodiments of the present disclosure, a system for position-based parking of a vehicle is provided. The system includes a roadside device and the vehicle. The roadside device is located within a predetermined range from a predetermined position and includes a sensing device, a roadside processing device and a communication device. The vehicle includes a vehicle-mounted processing device and a communication device. In the roadside device, the sensing device is configured to obtain positioning condition data regarding position-based parking of the vehicle at the predetermined position, the roadside processing device is configured to determine posture data of the vehicle based on the positioning condition data of the vehicle, and the communication device is configured to transmit the posture data of the vehicle to the vehicle. In the vehicle, the communication device is configured to receive the posture data from the roadside device, and the vehicle-mounted processing device is configured to decide whether the posture data satisfies a predetermined positioning rule, and if not, determine posture adjustment data for the vehicle and control the vehicle to perform a posture adjustment operation based on the posture adjustment data.

In some embodiments, the roadside processing device being configured to determine the posture data of the vehicle based on the positioning condition data of the vehicle may include the roadside processing device being configured to: simulate a positioning condition of the vehicle on a map based on the positioning condition data of the vehicle; and determine the posture data of the vehicle based on the positioning condition of the vehicle on the map.

In some embodiments, the vehicle-mounted processing device being configured to determine the posture adjustment data for the vehicle may include the vehicle-mounted processing device being configured to: compare the posture data of the vehicle with standard positioning data in the predetermined positioning rule and determine a difference between the posture data of the vehicle and the standard positioning data as the posture adjustment data for the vehicle.

In some embodiments, the vehicle-mounted processing device may further be configured to: determine that the position-based parking has completed when deciding that the posture data satisfies the predetermined positioning rule.

In some embodiments, the posture data of the vehicle may include at least one of: a direction of the vehicle, a position of the vehicle relative to the predetermined position, or a distance between the vehicle and the predetermined position.

In some embodiments, the posture adjustment operation may include at least one of: an engine operation, a steering wheel operation, a throttle operation or a brake operation.

In some embodiments, the sensing device may include at least one camera and/or a laser radar, and the positioning condition data may include image data and/or point cloud data.

In another aspect of the embodiments of the present disclosure, a method for position-based parking of a vehicle is provided. The method includes: deciding, by a vehicle-mounted processing device of the vehicle, whether received posture data satisfies a predetermined positioning rule, the posture data being received by a communication device of the vehicle, during position-based parking of the vehicle at a predetermined position, from a roadside device located within a predetermined range from the predetermined position; determining posture adjustment data for the vehicle when the received posture data does not satisfy the predetermined positioning rule; and controlling the vehicle to perform a posture adjustment operation based on the posture adjustment data.

In some embodiments, the operation of determining the posture adjustment data for the vehicle may include: comparing, by the vehicle-mounted processing device, the posture data of the vehicle with standard positioning data in the predetermined positioning rule and determining a difference between the posture data of the vehicle and the standard positioning data as the posture adjustment data for the vehicle.

In some embodiments, the method may further include: determining, by the vehicle-mounted processing device, that the position-based parking has completed when deciding that the posture data satisfies the predetermined positioning rule.

In some embodiments, the posture data of the vehicle may include at least one of: a direction of the vehicle, a position of the vehicle relative to the predetermined position, or a distance between the vehicle and the predetermined position.

In some embodiments, the posture adjustment operation may include at least one of: an engine operation, a steering wheel operation, a throttle operation or a brake operation.

In an aspect of the embodiments of the present disclosure, an apparatus in a vehicle for position-based parking of the vehicle is provided. The apparatus includes a processor and at least one memory storing at least one machine executable instruction. The processor is operative to execute the at least one machine executable instruction to: decide whether received posture data satisfies a predetermined positioning rule, the posture data being received by a communication device of the vehicle, during position-based parking of the vehicle at a predetermined position, from a roadside device located within a predetermined range from the predetermined position; determine posture adjustment data for the vehicle when the received posture data does not satisfy the predetermined positioning rule; and control the vehicle to perform a posture adjustment operation based on the posture adjustment data.

In some embodiments, the processor being operative to execute the at least one machine executable instruction to determine the posture adjustment data for the vehicle may include the processor being operative to execute the at least one machine executable instruction to: compare the posture data of the vehicle with standard positioning data in the predetermined positioning rule and determine a difference between the posture data of the vehicle and the standard positioning data as the posture adjustment data for the vehicle.

In some embodiments, the processor may further be operative to execute the at least one machine executable instruction to: determine that the position-based parking has completed when deciding that the posture data satisfies the predetermined positioning rule.

In some embodiments, the posture data of the vehicle may include at least one of: a direction of the vehicle, a position of the vehicle relative to the predetermined position, or a distance between the vehicle and the predetermined position.

In some embodiments, the posture adjustment operation may include at least one of: an engine operation, a steering wheel operation, a throttle operation or a brake operation.

In an aspect of the embodiments of the present disclosure, an apparatus in a vehicle for position-based parking of the vehicle is provided. The apparatus includes a deciding unit, a determining unit and a control unit. During position-based parking of the vehicle at a predetermined position, the deciding unit is configured to decide whether received posture data satisfies a predetermined positioning rule, the posture data being received by a communication device of the vehicle from a roadside device located within a predetermined range from the predetermined position during position-based parking of the vehicle at the predetermined position; the determining unit is configured to determine posture adjustment data for the vehicle when the deciding unit decides that the received posture data does not satisfy the predetermined positioning rule; and the control unit is configured to control the vehicle to perform a posture adjustment operation based on the posture adjustment data.

In some embodiments, the determining unit being configured to determine the posture adjustment data for the vehicle may include the determining unit being configured to: compare the posture data of the vehicle with standard positioning data in the predetermined positioning rule and determine a difference between the posture data of the vehicle and the standard positioning data as the posture adjustment data for the vehicle.

In some embodiments, the determining unit may further be configured to: determine that the position-based parking has completed when the deciding unit decides that the posture data satisfies the predetermined positioning rule.

In some embodiments, the posture data of the vehicle may include at least one of: a direction of the vehicle, a position of the vehicle relative to the predetermined position, or a distance between the vehicle and the predetermined position.

In some embodiments, the posture adjustment operation may include at least one of: an engine operation, a steering wheel operation, a throttle operation or a brake operation.

With the solutions according to the embodiments of the present disclosure, a roadside device is provided within a predetermined range from a predetermined position. The roadside device obtains positioning condition data regarding position-based parking of a vehicle at the predetermined position, determines posture data of the vehicle based on the positioning condition data of the vehicle, and transmits the posture data to the vehicle. The vehicle decides whether the posture data satisfies a predetermined positioning rule, and if not, determines posture adjustment data for the vehicle and controls the vehicle to perform a posture adjustment operation based on the posture adjustment data. In this way, the vehicle may be parked at the predetermined position accurately even with a weak GPS signal, thereby solving the problem in the related art that an unmanned vehicle cannot be parked at a specified position accurately in an environment with a weak GPS signal.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In the related art, in some application scenarios, unmanned vehicles may need to be parked accurately at some specified (or predetermined) positions. However, in these scenarios, there may typically be weak GPS signals or signal interference, such that it would be difficult to achieve accurate position-based parking of unmanned vehicles. In view of this, the embodiments of the present disclosure provide solutions for position-based parking of a vehicle, so as to solve the above problem.

In the solutions according to the embodiments of the present disclosure, a roadside device is provided within a predetermined range from a predetermined position. The roadside device obtains positioning condition data regarding position-based parking of a vehicle at the predetermined position, determines posture data of the vehicle based on the positioning condition data of the vehicle, and transmits the posture data to the vehicle. The vehicle decides whether the posture data satisfies a predetermined positioning rule, and if not, determines posture adjustment data for the vehicle and controls the vehicle to perform a posture adjustment operation based on the posture adjustment data. In this way, the vehicle may be parked at the predetermined position accurately even with a weak GPS signal, thereby solving the problem in the related art that an unmanned vehicle cannot be parked at a specified position accurately in an environment with a weak GPS signal.

The core idea of the present disclosure has been described above. The solutions according to the embodiments of the present disclosure will be described in further detail below with reference to the figures, such that they can be better understood by those skilled in the art and that the above objects, features and advantages of the embodiments of the present disclosure will become more apparent.

Figure 1A:
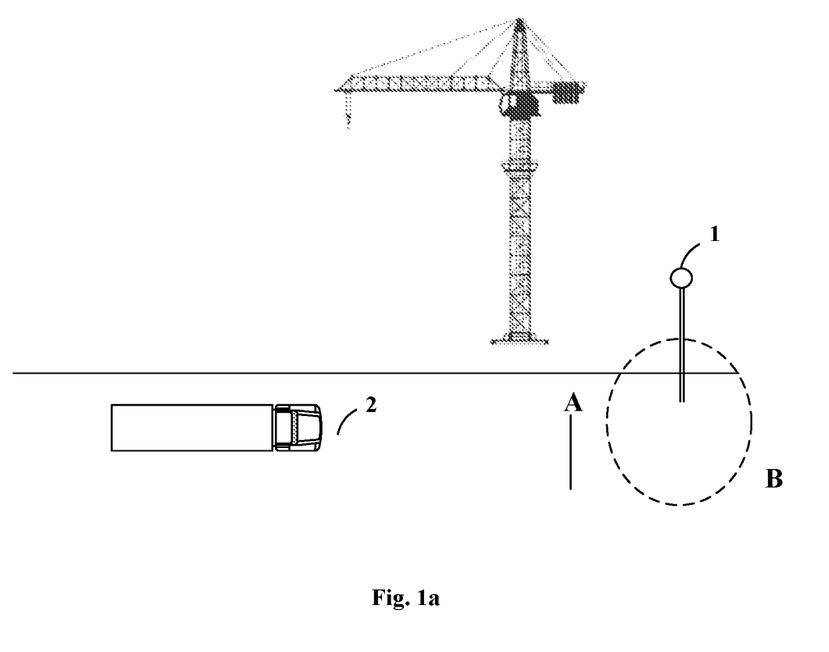
FIG. 1a is a schematic diagram showing a system for position-based parking of a vehicle according to some embodiments of the present disclosure.

The system for position-based parking of a vehicle according to the embodiments of the present disclosure can be applied in various environments such as a coastal port area, a highway port area, a mining area, a warehouse or an industrial park. FIG. 1a is illustrated with reference to an example of a coastal port area. FIG. 1a shows a system for position-based parking of a vehicle according to some embodiments of the present disclosure. The system includes a roadside device 1 and the vehicle 2. The roadside device 1 may be located within a predetermined range B from a predetermined position A. The predetermined position A may be set depending on requirements of application scenarios, e.g., as a loading and unloading position of a crane. The shape and/or size of the predetermined range B may be set depending on requirements of application scenarios, such that the roadside device 1 may monitor the position-based parking condition of the vehicle and communicate with the vehicle 2. The roadside device 1 may be installed at a predetermined height to avoid obstruction by objects or signal interference, thereby monitoring the vehicle 2 or communicating with the vehicle 2 effectively.

Figure 1B:
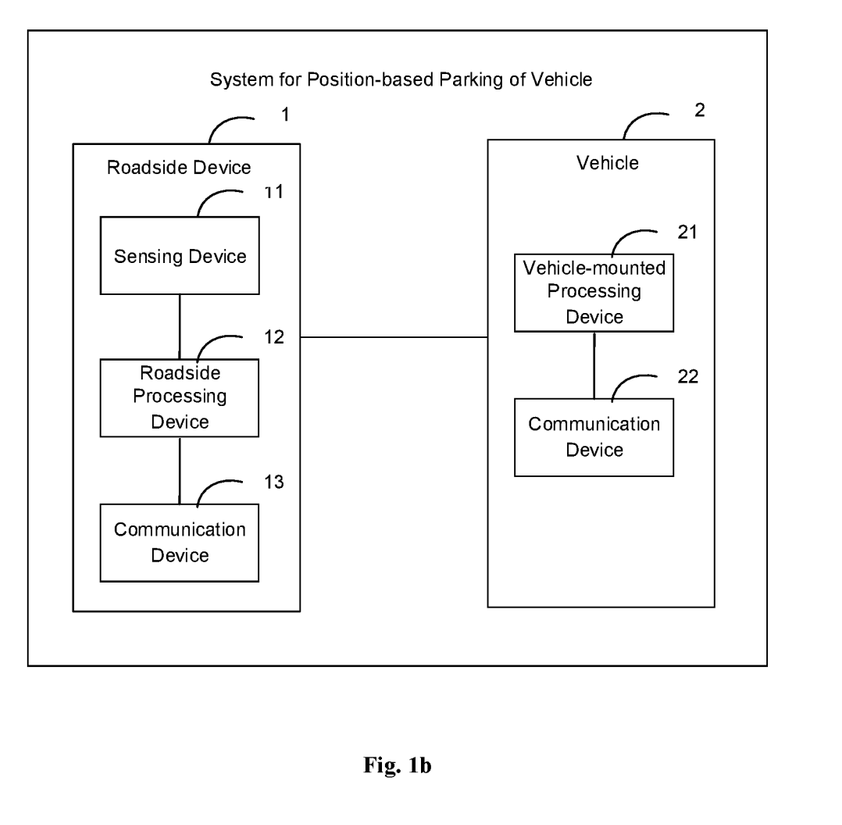
FIG. 1b is a block diagram showing a structure of a system for position-based parking of a vehicle according to some embodiments of the present disclosure.

FIG. 1b shows a structure of a system for position-based parking of a vehicle according to some embodiments of the present disclosure. As shown, the roadside device 1 includes a sensing device 11, a roadside processing device 12 and a communication device 13. The vehicle 2 includes a vehicle-mounted processing device 21 and a communication device 22.

In the roadside device 1, the sensing device 11 may be configured to obtain positioning condition data regarding position-based parking of the vehicle 2 at the predetermined position A. The sensing device 11 may include at least one camera for obtaining image data of the vehicle and its surrounding environment and/or a laser radar for obtaining point cloud of the vehicle and its surrounding environment. That is, the positioning condition data may include the image data and/or the point cloud data. The sensing device 11 may further include other sensors depending on requirements of specific application scenarios. In this case, the positioning condition data may further include data obtained by the other sensors.

The roadside processing device 12 may be configured to determine posture data of the vehicle based on the positioning condition data of the vehicle. The roadside processing device 12 may process positioning condition data preliminarily to obtain related data, e.g., the posture data of the vehicle, and communicate the related data with the vehicle 2, such that the amount of data to be communicated may be reduced and the processing speed and efficiency at the vehicle may be improved.

The roadside processing device 12 may determine the posture data of the vehicle based on the positioning condition data of the vehicle by performing the following steps.

At step S1, the roadside processing device 12 may simulate a positioning condition of the vehicle on a map based on the positioning condition data of the vehicle.

At step S2, the posture data of the vehicle may be determined based on the positioning condition of the vehicle on the map.

That is, the roadside processing device 12 may locate the image data and/or the point cloud data of the vehicle and its surrounding environment as obtained by the sensing device 11 onto map data, simulate the positioning condition of the vehicle on the map for analysis and obtain the posture data of the vehicle. The specific algorithm used here can be set depending on requirements of specific application scenarios, and the present disclosure is not limited to any specific algorithm.

The posture data of the vehicle may include at least one of: a direction of the vehicle, a position of the vehicle relative to the predetermined position, or a distance between the vehicle and the predetermined position. Depending on requirements of specific application scenarios, the posture data may further include various types of other data, including e.g., a distance between the vehicle body and a lane line, an angle between the vehicle body and a lane line, a tilt angle of the vehicle body, or the like.

The communication device 13 may be configured to transmit the posture data of the vehicle to the vehicle 2. The communication device 13 may use various communication protocols, including e.g., WiFi, 4G or Vehicle to Everything (V2X), to ensure effective communication between the roadside device 1 and the vehicle 2.

In the vehicle 2, the communication device 22 may be configured to receive the posture data from the roadside device, by using the communication protocol corresponding to the protocol used by the communication device 13 in the roadside device.

The vehicle-mounted processing device 21 may be configured to decide whether the posture data satisfies a predetermined positioning rule, and if not, determine posture adjustment data for the vehicle and control the vehicle 2 to perform a posture adjustment operation based on the posture adjustment data. The vehicle-mounted processing device 21 determines that the position-based parking has completed when deciding that the posture data satisfies the predetermined positioning rule.

The operation principles of the vehicle 2 will be explained below.

Figure 2:
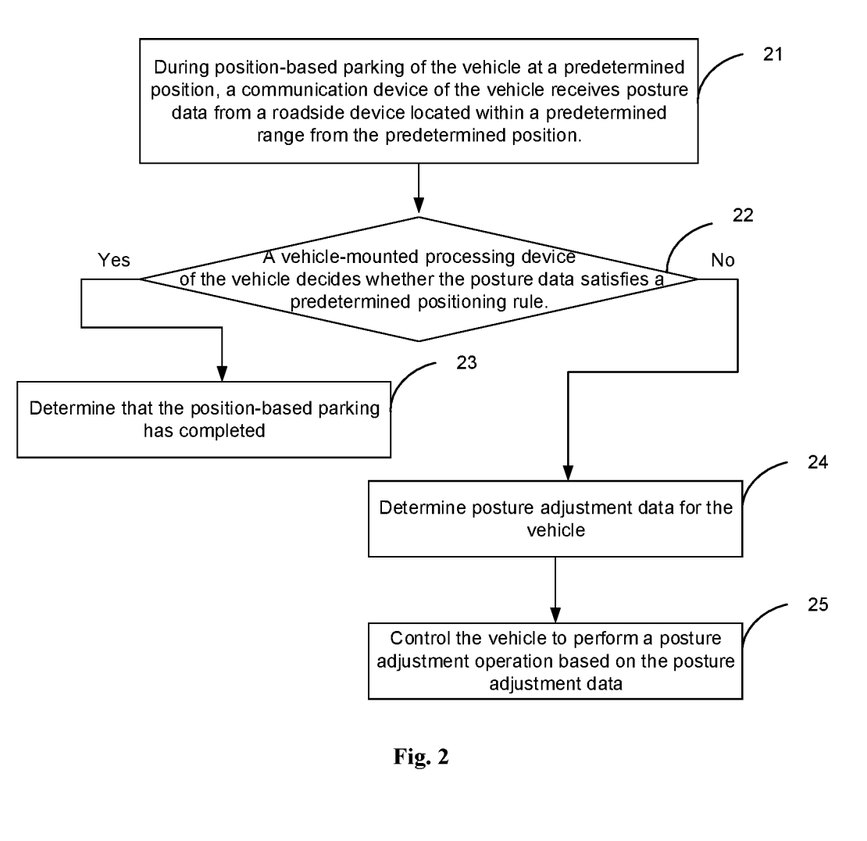
FIG. 2 is a flowchart illustrating a method for position-based parking of a vehicle according to some embodiments of the present disclosure.

FIG. 2 is a flowchart illustrating a method for position-based parking of a vehicle according to some embodiments of the present disclosure. The method includes the following steps.

At step 21, during position-based parking of the vehicle at a predetermined position, a communication device of the vehicle receives posture data from a roadside device located within a predetermined range from the predetermined position.

As described above, the communication device of the vehicle may communicate with the roadside device using various communication protocols to obtain the posture data transmitted from the roadside device. The posture data may include at least one of: a direction of the vehicle, a position of the vehicle relative to the predetermined position, or a distance between the vehicle and the predetermined position.

At step 22, a vehicle-mounted processing device of the vehicle decides whether the posture data satisfies a predetermined positioning rule. If so, the method proceeds with step 23; or otherwise the method proceeds with step 24.

For example, the predetermined positioning rule may include:

a) a location of the predetermined position A;

b) a distance between the front of the vehicle and the predetermined position not being larger than 10 cm; and c) a direction the front of the vehicle faces being within X±Y, where X denotes a direction and Y denotes an offset.

Here, standard positioning data may include: the location of the predetermined position, and the direction the front of the vehicle faces being X.

The posture data of the vehicle may include: the distance between the front of the vehicle and the predetermined position being 1 m, and the direction the front of the vehicle faces being X+Z, where Z is an offset towards a particular direction and Z>Y.

Apparently the posture data of the vehicle does not satisfy the positioning rule.

At step 23, it is determined that the position-based parking has completed and the method ends.

At step 24, posture adjustment data for the vehicle is determined.

Here, the vehicle-mounted processing device 21 may determine the posture adjustment data based on the posture data of the vehicle and the predetermined positioning rule by performing the following steps.

At step Sa, the posture data of the vehicle is compared with the standard positioning data in the predetermined positioning rule to determine a difference between the posture data of the vehicle and the standard positioning data.

At step Sb, the difference is determined as the posture adjustment data for the vehicle.

For example, when the posture data of the vehicle includes the distance between the front of the vehicle and the predetermined position being 1 m and the direction the front of the vehicle faces being X+Z, and the standard positioning data includes the location of the predetermined position and the direction the front of the vehicle faces being X, the posture data of the vehicle and the standard positioning data may be compared to determine the differences between their respective parameters as the posture adjustment data, e.g., the vehicle to move 1 m forward and the angle of the vehicle to be adjusted by −Z.

At step 25, the vehicle is controlled to perform a posture adjustment operation based on the posture adjustment data.

Here, the posture adjustment operation to be performed by the vehicle-mounted processing device may include at least one of: an engine operation, a steering wheel operation, a throttle operation or a brake operation. Other operations can be performed depending on requirements of specific application scenarios.

For example, based on the posture adjustment data including the vehicle to move 1 m forward and the angle of the vehicle to be adjusted by −Z, the posture adjustment operation may include: an engine operation, a steering wheel operation for angle adjustment of −Z, a steering wheel resetting operation, a throttle operation and a brake operation.

With the solutions according to the embodiments of the present disclosure, a roadside device is provided within a predetermined range from a predetermined position. The roadside device obtains positioning condition data regarding position-based parking of a vehicle at the predetermined position, determines posture data of the vehicle based on the positioning condition data of the vehicle, and transmits the posture data to the vehicle. The vehicle decides whether the posture data satisfies a predetermined positioning rule, and if not, determines posture adjustment data for the vehicle and controls the vehicle to perform a posture adjustment operation based on the posture adjustment data. In this way, the vehicle may be parked at the predetermined position accurately even with a weak GPS signal, thereby solving the problem in the related art that an unmanned vehicle cannot be parked at a specified position accurately in an environment with a weak GPS signal.

Based on the same inventive concept, an apparatus for position-based parking of a vehicle is provided according to some embodiments of the present disclosure.

Figure 3:
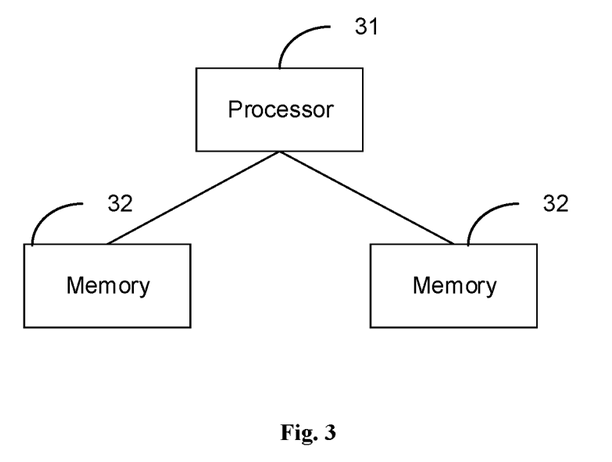
FIG. 3 is a block diagram showing a structure of an apparatus for position-based parking of a vehicle according to some embodiments of the present disclosure.

FIG. 3 is a block diagram showing a structure of an apparatus for position-based parking of a vehicle according to some embodiments of the present disclosure. The apparatus is provided in the vehicle and includes a processor 31 and at least one memory 32 storing at least one machine executable instruction.

During position-based parking of the vehicle at a predetermined position, a communication device of the vehicle receives posture data from a roadside device.

In the apparatus shown in FIG. 3, the processor 31 may be operative to execute the at least one machine executable instruction stored in the memory 32 to decide whether the posture data satisfies a predetermined positioning rule, determine posture adjustment data for the vehicle when the received posture data does not satisfy the predetermined positioning rule and control the vehicle to perform a posture adjustment operation based on the posture adjustment data. The processor 31 is further operative to execute the at least one machine executable instruction to determine that the position-based parking has completed when deciding that the posture data satisfies the predetermined positioning rule.

In some embodiments, the processor may be operative to execute the at least one machine executable instruction to determine the posture adjustment data for the vehicle by: comparing the posture data of the vehicle with standard positioning data in the predetermined positioning rule and determining a difference between the posture data of the vehicle and the standard positioning data as the posture adjustment data for the vehicle.

Here, the posture data of the vehicle may include at least one of: a direction of the vehicle, a position of the vehicle relative to the predetermined position, or a distance between the vehicle and the predetermined position. The posture adjustment operation may include at least one of: an engine operation, a steering wheel operation, a throttle operation or a brake operation.

With the solutions according to the embodiments of the present disclosure, a roadside device is provided within a predetermined range from a predetermined position. The roadside device obtains positioning condition data regarding position-based parking of a vehicle at the predetermined position, determines posture data of the vehicle based on the positioning condition data of the vehicle, and transmits the posture data to the vehicle. The vehicle decides whether the posture data satisfies a predetermined positioning rule, and if not, determines posture adjustment data for the vehicle and controls the vehicle to perform a posture adjustment operation based on the posture adjustment data. In this way, the vehicle may be parked at the predetermined position accurately even with a weak GPS signal, thereby solving the problem in the related art that an unmanned vehicle cannot be parked at a specified position accurately in an environment with a weak GPS signal.

Based on the same inventive concept, an apparatus for position-based parking of a vehicle is provided according to an embodiment of the present disclosure.

Figure 4:
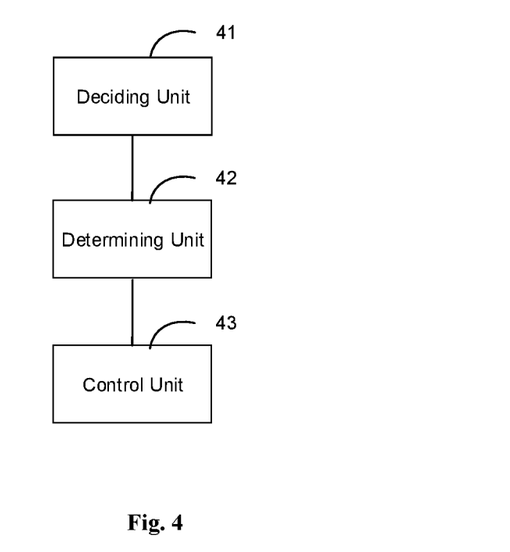
FIG. 4 is a block diagram showing another structure of an apparatus for position-based parking of a vehicle according to some embodiments of the present disclosure.

FIG. 4 is a block diagram showing a structure of an apparatus for position-based parking of a vehicle according to an embodiment of the present disclosure. The apparatus is provided in the vehicle and includes a deciding unit, a determining unit and a control unit.

During position-based parking of the vehicle at a predetermined position, the deciding unit 41 may be configured to decide whether received posture data satisfies a predetermined positioning rule. The posture data is received by a communication device of the vehicle from a roadside device located within a predetermined range from the predetermined position during position-based parking of the vehicle at the predetermined position. The posture data of the vehicle may include at least one of: a direction of the vehicle, a position of the vehicle relative to the predetermined position, or a distance between the vehicle and the predetermined position.

The determining unit 42 may be configured to determine posture adjustment data for the vehicle when the deciding unit decides that the received posture data does not satisfy the predetermined positioning rule. In some embodiments, the determining unit 42 may further be configured to: determine that the position-based parking has completed when the deciding unit decides that the posture data satisfies the predetermined positioning rule.

In some embodiments, the determining unit 42 may determine the posture adjustment data for the vehicle by: comparing the posture data of the vehicle with standard positioning data in the predetermined positioning rule and determining a difference between the posture data of the vehicle and the standard positioning data as the posture adjustment data for the vehicle.

The control unit 43 is configured to control the vehicle to perform a posture adjustment operation based on the posture adjustment data.

In some embodiments, the posture adjustment operation may include at least one of: an engine operation, a steering wheel operation, a throttle operation or a brake operation.

With the solutions according to the embodiments of the present disclosure, a roadside device is provided within a predetermined range from a predetermined position. The roadside device obtains positioning condition data regarding position-based parking of a vehicle at the predetermined position, determines posture data of the vehicle based on the positioning condition data of the vehicle, and transmits the posture data to the vehicle. The vehicle decides whether the posture data satisfies a predetermined positioning rule, and if not, determines posture adjustment data for the vehicle and controls the vehicle to perform a posture adjustment operation based on the posture adjustment data. In this way, the vehicle may be parked at the predetermined position accurately even with a weak GPS signal, thereby solving the problem in the related art that an unmanned vehicle cannot be parked at a specified position accurately in an environment with a weak GPS signal.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for position-based parking of an unmanned vehicle, comprising:
   a roadside device comprising a sensing device, a roadside processing device, and a communication device, the roadside device being located within a predetermined range from a predetermined position and configured to:
   obtain, using the sensing device, positioning condition data of the unmanned vehicle;
   simulate a positioning condition of the unmanned vehicle on a map based on the positioning condition data of the unmanned vehicle, using the roadside processing device;
   determine a direction that a front of the unmanned vehicle is facing and a distance between the unmanned vehicle and the predetermined position based on the positioning condition data of the unmanned vehicle on the map, using the roadside processing device; and
   transmit, using the communication device, posture data of the unmanned vehicle including the direction the front of the unmanned vehicle is facing and the distance between the unmanned vehicle and the predetermined position to the unmanned vehicle; and
   a device in the unmanned vehicle configured to:
   receive the posture data including the direction the front of the unmanned vehicle is facing and the distance between the unmanned vehicle and the predetermined position from the roadside device, and
   determine whether the posture data of the vehicle satisfies a predetermined positioning rule, and if not, determine a difference between the posture data of the unmanned vehicle and standard positioning data as posture adjustment data for the unmanned vehicle;
   control the unmanned vehicle to perform a posture adjustment operation using the posture adjustment data; and
   determine that the position-based parking has completed when the posture data of the unmanned vehicle transmitted from the roadside device satisfies the predetermined positioning rule,
   wherein the posture adjustment operation comprises at least one of: an engine operation, a steering wheel operation, a throttle operation, or a brake operation,
   wherein the predetermined positioning rule comprises:
      a location of the predetermined position;
      a distance between the front of the unmanned vehicle and the predetermined position not being larger than 10 cm; and
      a direction the front of the vehicle face being within X±Y, where Y denotes an offset and where X denotes the direction the front of the unmanned vehicle faces;
   and wherein the posture adjustment data describes at least one adjustment to a direction or a position of the unmanned vehicle.

2. The system of claim 1, wherein the device in the unmanned vehicle is configured to:
compare the posture data of the unmanned vehicle with the standard positioning data in the predetermined positioning rule, wherein the standard positioning data comprises the location of the predetermined position and the direction that the front of the unmanned vehicle faces a preset direction.

3. The system of claim 1, wherein the roadside device comprises a laser radar, and
the positioning condition data comprises point cloud data for the unmanned vehicle and its surrounding environment.

4. A method of position-based parking of an unmanned vehicle, comprising:
determining, by a device in the unmanned vehicle, whether received posture data of the unmanned vehicle including the direction the front of the unmanned vehicle is facing and the distance between the unmanned vehicle and the predetermined position satisfies a predetermined positioning rule, wherein the posture data of the unmanned vehicle that is received by the device in the unmanned vehicle is sent from a roadside device comprising a sensing device, a roadside processing device, and a communication device, the roadside device located within a predetermined range from a predetermined position, and wherein the roadside device is configured to:
simulate, using the roadside processing device, a positioning condition of the unmanned vehicle on a map based on a positioning condition data of the unmanned vehicle; and
determine, using the roadside processing device, posture data comprising the direction the front of the unmanned vehicle is facing and the distance between the unmanned vehicle and the predetermined position based on the positioning condition of the unmanned vehicle on the map;
determining, by the device in the unmanned vehicle, a difference between the received posture data of the unmanned vehicle and standard positioning data as posture adjustment data for the unmanned vehicle when the received posture data of the unmanned vehicle does not satisfy the predetermined positioning rule;
controlling, by the device in the unmanned vehicle, the unmanned vehicle to perform a posture adjustment operation using the posture adjustment data; and
determining that the position-based parking has completed when the posture data of the vehicle transmitted from the roadside device satisfies the predetermined positioning rule,
wherein the posture adjustment operation comprises at least one of: an engine operation, a steering wheel operation, a throttle operation, or a brake operation,
wherein the predetermined positioning rule comprises:
a location of the predetermined position;
a distance between the front of the unmanned vehicle and the predetermined position not being larger than 10 cm; and
a direction the front of the vehicle face being within $X \pm Y$, where Y denotes an offset and where X denotes the direction the front of the unmanned vehicle faces;

wherein the posture adjustment data describes at least one adjustment to a direction or a position of the unmanned vehicle.

5. The method of claim 4, wherein said determining, by the device in the unmanned vehicle, whether the received posture data of the vehicle satisfies the predetermined positioning rule comprises:
comparing the posture data of the unmanned vehicle with the standard positioning data in the predetermined positioning rule, wherein the standard positioning data comprises the location of the predetermined position and the direction that the front of the unmanned vehicle faces a preset direction.

6. An apparatus in an unmanned vehicle for position-based parking of the unmanned vehicle, comprising a processor and a memory storing at least one machine executable instruction, the processor being configured to execute the at least one machine executable instruction to:
determine whether received posture data of the unmanned vehicle including the direction the front of the unmanned vehicle is facing and the distance between the unmanned vehicle and the predetermined position satisfies a predetermined positioning rule, the posture data of the unmanned vehicle being received by the apparatus during position-based parking of the unmanned vehicle at a predetermined position from a roadside device located within a predetermined range from the predetermined position;
determine a difference between the received posture data of the vehicle and standard positioning data as posture adjustment data for the unmanned vehicle when the received posture data of the unmanned vehicle does not satisfy the predetermined positioning rule;
control the unmanned vehicle to perform a posture adjustment operation using the posture adjustment data;
determine that the position-based parking has completed when the posture data of the vehicle transmitted from the roadside device satisfies the predetermined positioning rule,
wherein the roadside device comprising a sensing device, a roadside processing device, and a communication device;
wherein the posture data comprising the direction the front of the unmanned vehicle is facing and the distance between the unmanned vehicle and the predetermined position being determined based on a positioning condition of the unmanned vehicle on a map using the roadside processing device, the positioning condition being simulated and based on positioning condition data of the unmanned vehicle;
wherein the posture adjustment operation comprises at least one of: an engine operation, a steering wheel operation, a throttle operation, or a brake operation;
wherein the predetermined positioning rule comprises:
a location of the predetermined position;
a distance between the front of the unmanned vehicle and the predetermined position not being larger than 10 cm; and
a direction the front of the vehicle face being within $X \pm Y$, where Y denotes an offset and where X denotes the direction the front of the unmanned vehicle faces; and
wherein the posture adjustment data describes at least one adjustment to a direction or a position of the unmanned vehicle.

7. The apparatus of claim 6, wherein the processor being configured to execute the at least one machine executable instruction to:

compare the posture data of the unmanned vehicle with the standard positioning data in the predetermined positioning rule, wherein the standard position data comprises the location of the predetermined position and the direction that the front of the unmanned vehicle faces a preset direction.

8. The system of claim 1, wherein the sensing device of the roadside device comprises at least one camera, and the positioning condition data comprises image data.

9. The system of claim 1, wherein the posture data of the unmanned vehicle comprises at least one of: a distance between the vehicle body and a lane line, an angle between the vehicle body and a lane line, or a tilt angle of the vehicle body.

10. The method of claim 4, wherein the posture data of the unmanned vehicle comprises at least one of: a distance between the vehicle body and a lane line, an angle between the vehicle body and a lane line, or a tilt angle of the vehicle body.

11. The apparatus of claim 6, wherein the posture data of the unmanned vehicle comprises at least one of: a distance between the vehicle body and a lane line, an angle between the vehicle body and a lane line, or a tilt angle of the vehicle body.

12. The system of claim 1, wherein the posture data of the unmanned vehicle further comprises a position of the vehicle relative to the predetermined position.

13. The method of claim 4, wherein the posture data of the unmanned vehicle further comprises a position of the vehicle relative to the predetermined position.

14. The apparatus of claim 6, wherein the posture data of the unmanned vehicle further comprises a position of the vehicle relative to the predetermined position.

15. The system of claim 1, wherein the system operates to park the vehicle at the predetermined position even with a weak GPS signal.

16. The system of claim 1, wherein the predetermined position is set depending on a loading and unloading position of a crane.

17. The system of claim 1, wherein the roadside device is installed at a predetermined height to avoid objects or signal interference, so that the roadside device is configured to monitor the vehicle or communicate with the vehicle in a coastal port area, a highway port area, a mining area, a warehouse, or an industrial park.

* * * * *

UNITED STATES PATENT AND TRADEMARK OFFICE
CERTIFICATE OF CORRECTION

| | |
|---|---|
| PATENT NO. | : 11,532,230 B2 |
| APPLICATION NO. | : 16/272883 |
| DATED | : December 20, 2022 |
| INVENTOR(S) | : Nan Wu et al. |

It is certified that error appears in the above-identified patent and that said Letters Patent is hereby corrected as shown below:

In the Drawings

• In Fig. 2, Sheet 3 of 4, for Tag "23", in Line 2, delete "has completed" and insert -- has been completed --, therefor.

In the Specification |

• In Column 1, Line 8, delete "20180143105.0" and insert -- 201810143105.0 --, therefor.

• In Column 1, Line 11, delete "of China (SIPO)" and insert -- (SIPO) of China --, therefor.

In the Claims

• In Column 10, Line 44, in Claim 1, delete "device, and" and insert -- device; --, therefor.

• In Column 11, Line 37, in Claim 4, delete "vehicle; and" and insert -- vehicle; --, therefor.

• In Column 11, Line 67, in Claim 4, delete "faces;" and insert -- faces; and --, therefor.

Signed and Sealed this
Fourteenth Day of March, 2023

Katherine Kelly Vidal
*Director of the United States Patent and Trademark Office*